United States Patent [19]
Fahl

[11] Patent Number: 6,015,168
[45] Date of Patent: Jan. 18, 2000

[54] PIVOTAL LOCK FOR COUPLING CAM ARMS

[75] Inventor: Richard L. Fahl, Fairfield, Ohio

[73] Assignee: Dover Corp., New York, N.Y.

[21] Appl. No.: 08/853,100

[22] Filed: May 8, 1997

[51] Int. Cl.[7] .................................................. F16L 37/00
[52] U.S. Cl. .............................. 285/81; 285/312; 285/88
[58] Field of Search .................................. 285/81, 87, 88, 285/312

[56] References Cited

U.S. PATENT DOCUMENTS

| | | | |
|---|---|---|---|
| 882,690 | 3/1908 | Jones | 285/312 |
| 1,481,392 | 1/1924 | Schawrow | 285/312 |
| 3,124,374 | 3/1964 | Krapp | 285/312 |
| 3,314,698 | 4/1967 | Owens | 285/312 |
| 3,439,942 | 4/1969 | Moore | 285/312 |
| 4,222,593 | 9/1980 | Lauffenburger | 285/312 |
| 4,647,075 | 3/1987 | Vargo | 285/312 |
| 4,802,694 | 2/1989 | Vargo | 285/312 |
| 5,295,717 | 3/1994 | Chen | 285/317 |
| 5,338,069 | 8/1994 | McCarthy | 285/312 |
| 5,368,343 | 11/1994 | Allen | 285/317 |
| 5,816,623 | 10/1998 | Chang | 285/312 |

FOREIGN PATENT DOCUMENTS

| | | | |
|---|---|---|---|
| 7-4990 | 1/1995 | Japan . | |
| 741191 | 11/1955 | United Kingdom | 285/312 |

*Primary Examiner*—Eric K. Nicholson
*Attorney, Agent, or Firm*—Dinsmore & Shohl LLP

[57] ABSTRACT

A locking mechanism for securing a cam arm of a coupling member in a locked position to prevent inadvertent rotation of the cam arm. The locking mechanism includes a locking member that is pivotally connected to the cam arm and is adapted to selectively interface with a portion of a coupling member. The locking mechanism is easy to clean and maintain and allows for the unlocking of a cam arm in one continuous motion.

29 Claims, 5 Drawing Sheets

PIVOTAL LOCK FOR COUPLING CAM ARMS

TECHNICAL FIELD

The present invention relates generally to quick disconnect couplings of the type that include pivotally mounted cam arms for quickly attaching or disattaching a male coupling member to a female coupling member and, more particularly, to locking assemblies for selectively securing such cam arms in a locked position. Even more specifically, the invention relates to such an assembly that includes a locking member that is pivotally movable relative to the cam arm and is adapted to selectively engage a portion of a coupling member.

BACKGROUND OF THE INVENTION

Today, quick disconnect couplings are widely used to connect and disconnect hoses and other types of fluid conduits. One particularly advantageous type of coupling uses a male coupling member having an annular groove adjacent its connecting terminus. The male coupling member is received by and selectively coupled to a female coupling member that includes a pair of oppositely disposed pivotally mounted cam arms. The cam arms are manually movable between an unlocked position, in which the arms extend radially outwardly from the female coupling member, to a lock position, in which the cam arms are positioned alongside of the female coupling member. The cam arms include cam surfaces which are configured such that the radial extension of the cam surfaces vary in accordance with the position of the cam arms. When the cam arms are in an unlocked position, the cam surfaces do not extend fully into the groove of the male coupling member, and the male coupling member is axially movable out of the female coupling member. When the cam arms are in the lock position, the cam surfaces extend fully into and are pressed against the annular groove of the male coupling member, thereby securing the male and female coupling members in interlocking relationship.

Unless the cam arms are adequately prevented from rotation, there is a risk that they can be inadvertently rotated. Inadvertent rotation of the cam arms will uncouple the male coupling member from the female coupling member. Thus it has been found desirable to provide mechanisms for preventing such inadvertent rotation. One such mechanism, widely used today, is exemplified in U.S. Pat. Nos. 5,295,717 and 5,435,604. This mechanism includes a reciprocally movable plunger disposed in each of the cam arms. The plunger is spring biased to an extended position. When in this extended position, an inboard end of the plunger passes through a complimentary shaped hole in a retaining seat of the female coupling member, thereby preventing relative rotation between the cam arm and the female coupling member. The outboard end of the plunger is attached to a pull ring. Pulling of the ring overcomes the bias of the plunger spring and retracts the plunger into the cam arm. When the plunger is retracted, rotational movement of the cam arm to the unlocked position is permitted. Upon rotating the cam arm from the unlocked position to the locked position, an inclined surface at the tip of the plunger abuts a distal surface of the retaining seat in order to guide the plunger into the complementary shaped hole.

While plunger type locking mechanisms successfully prevent the inadvertent rotation of cam arms, they still have a number of shortcomings. One significant shortcoming relates to maintenance of these locking mechanisms. Because quick disconnect couplings are typically used at or near gasoline filling stations, they are frequently exposed to dirt, fuel, and grease. These elements easily become lodged in the interior recesses of the coupling member, including the passageway that houses the plunger. When this passageway becomes exposed to dirt and other debris, the movement of the plunger can be impeded and, thus, the device can fail to lock the cam arms. Moreover, it is often difficult to remove dirt and debris from the passageway because of its small size and because other parts of the coupling, including the plunger itself, obstruct access to the passageway.

In addition to being difficult to clean and maintain, plunger type mechanisms make the disconnection of the coupling members more time consuming and difficult. To unlock the coupling members when a plunger type locking mechanism is employed, the ring attached to the plunger must first be pulled in a direction parallel with the longitudinal axis of the coupling. The pulling of the ring overcomes the bias of the plunger spring and removes the plunger from the complimentary shaped hole. When plunger is clear of the hole, the cam arms can then be rotated radially outwardly from the female coupling member. Once the cam arms are rotated to their unlocked position, the coupling members can be disconnected. Thus, two movements are required to unlock the coupling members: one movement substantially parallel to the axis of the coupling members (for removing the plunger), and one movement substantially perpendicular to the axis of the coupling members (for rotating the cam arms). These two movements are more time consuming and difficult to perform than a single continuous movement.

In addition, plunger type locking mechanisms may also require the user to utilize two hands to unlock one cam arm: one hand to steady the coupling and the other hand to pull the plunger and then rotate the cam arm. Thus, only one such mechanism could be unlocked at a time by the user, making the process of unlocking two cam arms (the number typically used with quick disconnect couplings) more time consuming and difficult. A more efficient design would permit the unlocking of both cam arms simultaneously.

Moreover, plunger type locking mechanisms can fail when the pull ring is removed or damaged. The pull ring prevents rotation of the plunger about its axis, thereby preventing the inclined surface of the plunger from being misplaced relative to the distal surface of the retaining seat when the cam arm is being pivoted to the locked position. If the pull ring is damaged or removed, the plunger may rotate about its axis, causing the inclined surface to become misaligned from the distal surface and preventing the plunger from being guided into the complementary shaped hole. This misalignment can result in the failure of the locking mechanism as well as damage to the coupling and/or the mechanism itself.

Accordingly, to overcome the above and other problems, it is desirable to have a lock mechanism for limiting the rotation of a cam arm which is easy to clean and maintain. Furthermore, it is desirable to have such a mechanism that permits the unlocking of a cam arm by a single continuous movement from the user. It is also desirable to have such a mechanism that allows both cam arms to be unlocked simultaneously. Moreover, a lock mechanism that functions without the presence of a pull ring is desired.

SUMMARY OF THE INVENTION

It is one object of this invention to provide a lock mechanism for securing cam arms which is relatively easy to clean and maintain.

It is another object of the present invention to provide a lock mechanism for securing cam arms which allows for the unlocking of the mechanism and the rotation of the cam arms in one continuous movement.

It is yet another object of the present invention to provide a lock mechanism for securing cam arms which can be utilized with another similar lock mechanism, both of which can be unlocked simultaneously.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, an assembly is provided for selectively interlocking two coupling members. The assembly includes a cam arm and a locking member. The cam arm has a first and second ends and is adapted to be pivotally connected to a first coupling member about a pivotal axis located proximal its first end. The cam arm includes a cam surface at its first end adapted to selectively interface with a second coupling member for securing the second coupling member with respect to the first coupling member. The locking member is pivotally connected to the cam arm about a pivotal axis. The locking member is also pivotally movable relative to the cam arm and is adapted to selectively engage a portion of a coupling member.

Preferably, the cam arm is pivotally connected to the first coupling member about a first pivotal axis, and the locking member is pivotally connected to the cam arm about a second pivotal axis that is in spaced relationship to the first pivotal axis.

It is also preferred that the assembly include a locking interface structure on the first coupling member and that the locking member have a locking interface portion adapted to cooperatively interface with the locking interface structure. The locking interface portion is selectively engageable with the locking interface structure to selectively prevent relative rotation between the cam arm and the first coupling member when the cam arm is in a locked position. It is preferred that the locking interface structure comprise a base portion, an upper portion, and an opening defined by the base portion and the upper portion. It is also preferred that the locking interface portion include a recess for engaging the upper portion and a male portion for engaging the opening.

In another preferred aspect of the invention, the assembly includes a biasing mechanism disposed between the locking member and the cam arm for biasing the locking member to a predetermined pivotal position with respect to the cam arm. Preferably, the biasing mechanism is a spring disposed between a contact surface on the cam arm and a surface on the locking member.

In yet another preferred aspect of the invention, the assembly includes a release mechanism. The application of force to the release mechanism is operative to compress the spring between the contact surface and the locking member, disengage the locking member from the locking interface structure, and rotate the cam arm away from the first coupling member and toward the unlocked position.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawing and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF PREFERRED EMBODIMENT

Figure 1:
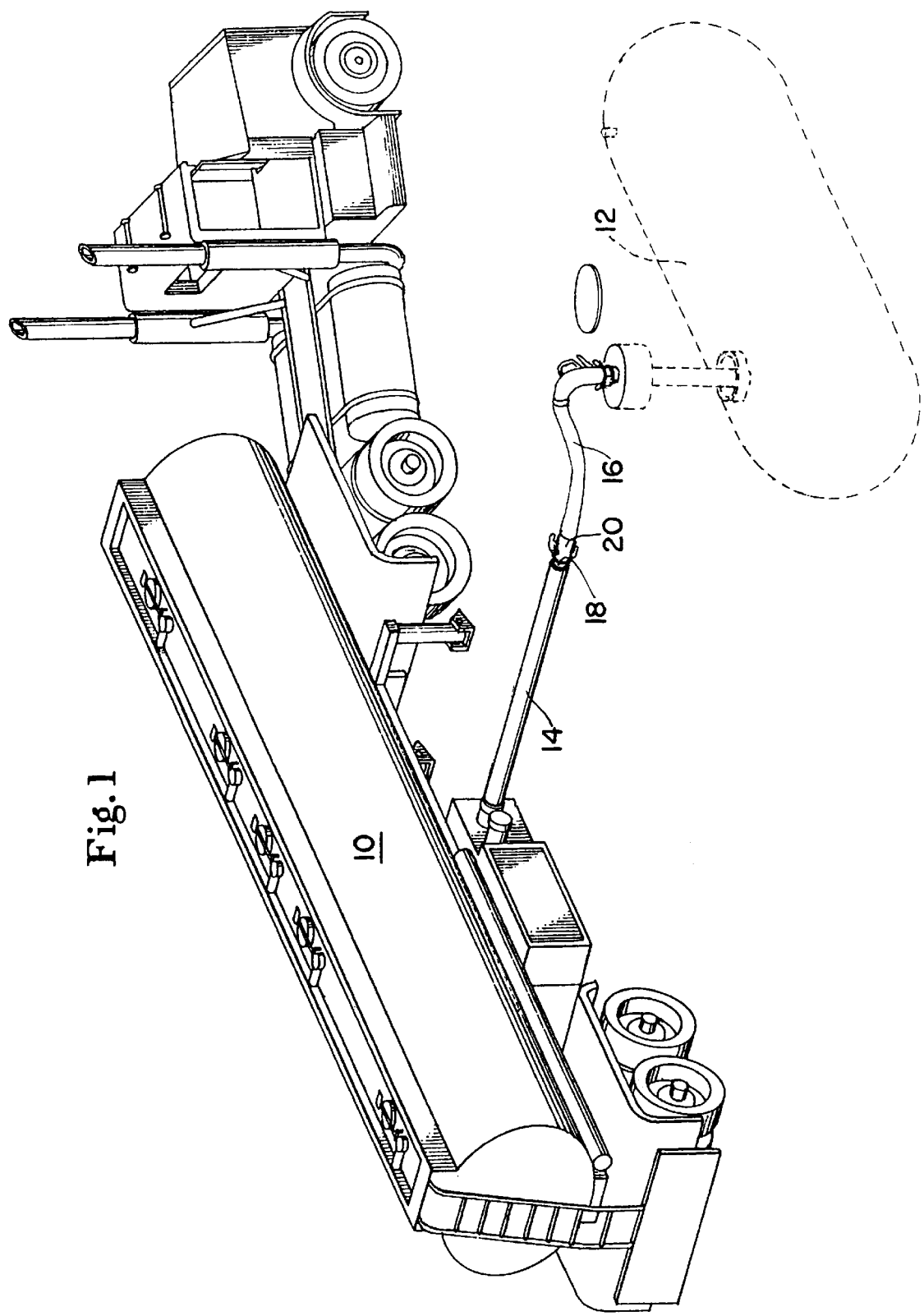
FIG. 1 is a schematic illustration showing one application for couplings of the type to which the present invention is directed.

Referring now to the drawings, wherein like numerals indicate the same elements throughout the views, FIG. 1 depicts a gasoline storage truck, generally designated by the numeral 10, as it is being used to dispense gasoline into an underground storage tank 12 through a plurality of interconnected hoses 14 and 16. The hoses 14 and 16 are coupled by male coupling member 18 and female coupling member 20 respectively connected to adjoining ends of the hoses 14 and 16.

Figure 2:
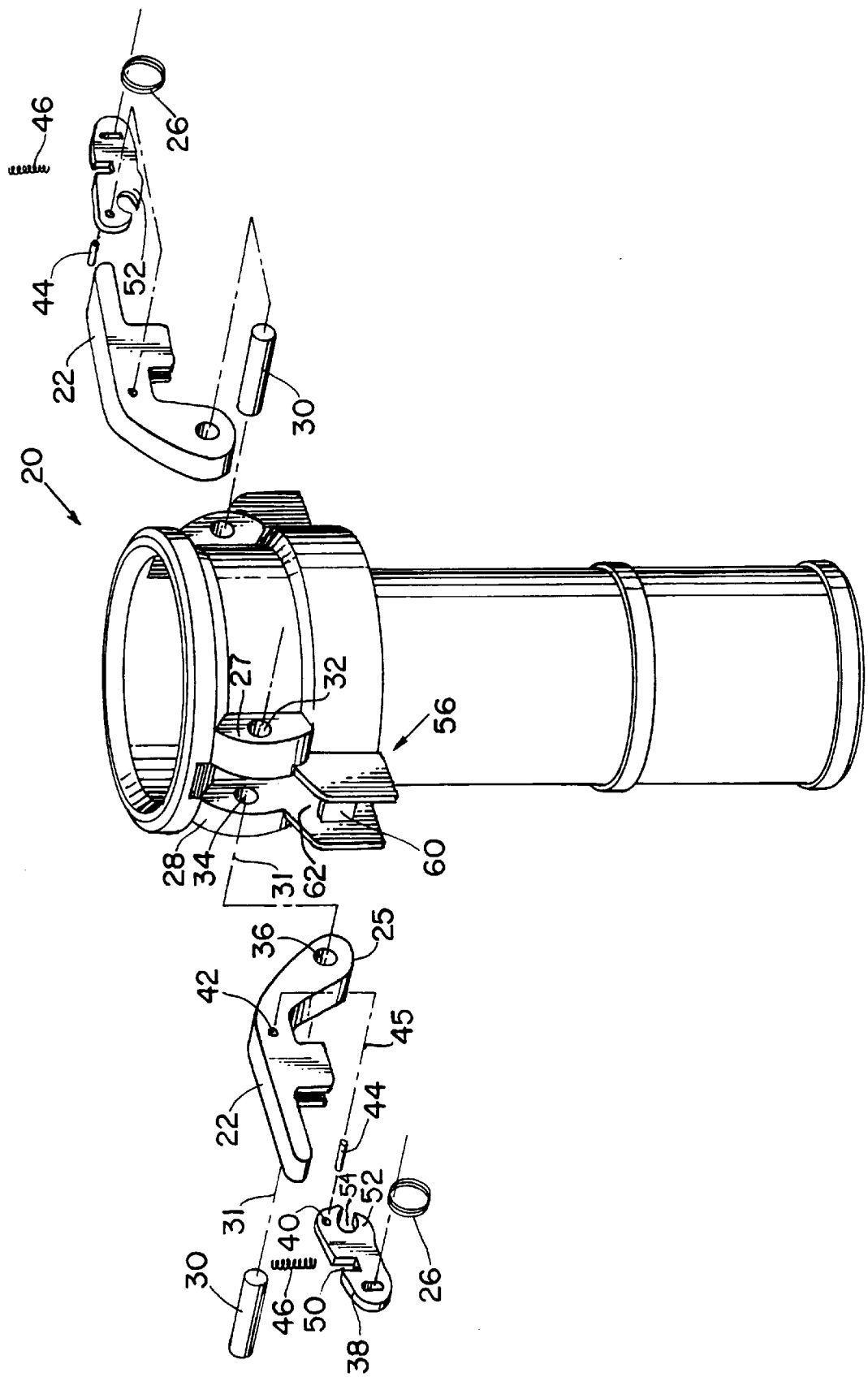
FIG. 2 is a partially exploded perspective view of a female coupling member with pivotally mounted cam arms and a mechanism for maintaining the cam arms in the locked position, constructed in accordance with the principles of the present invention.
Figure 3:
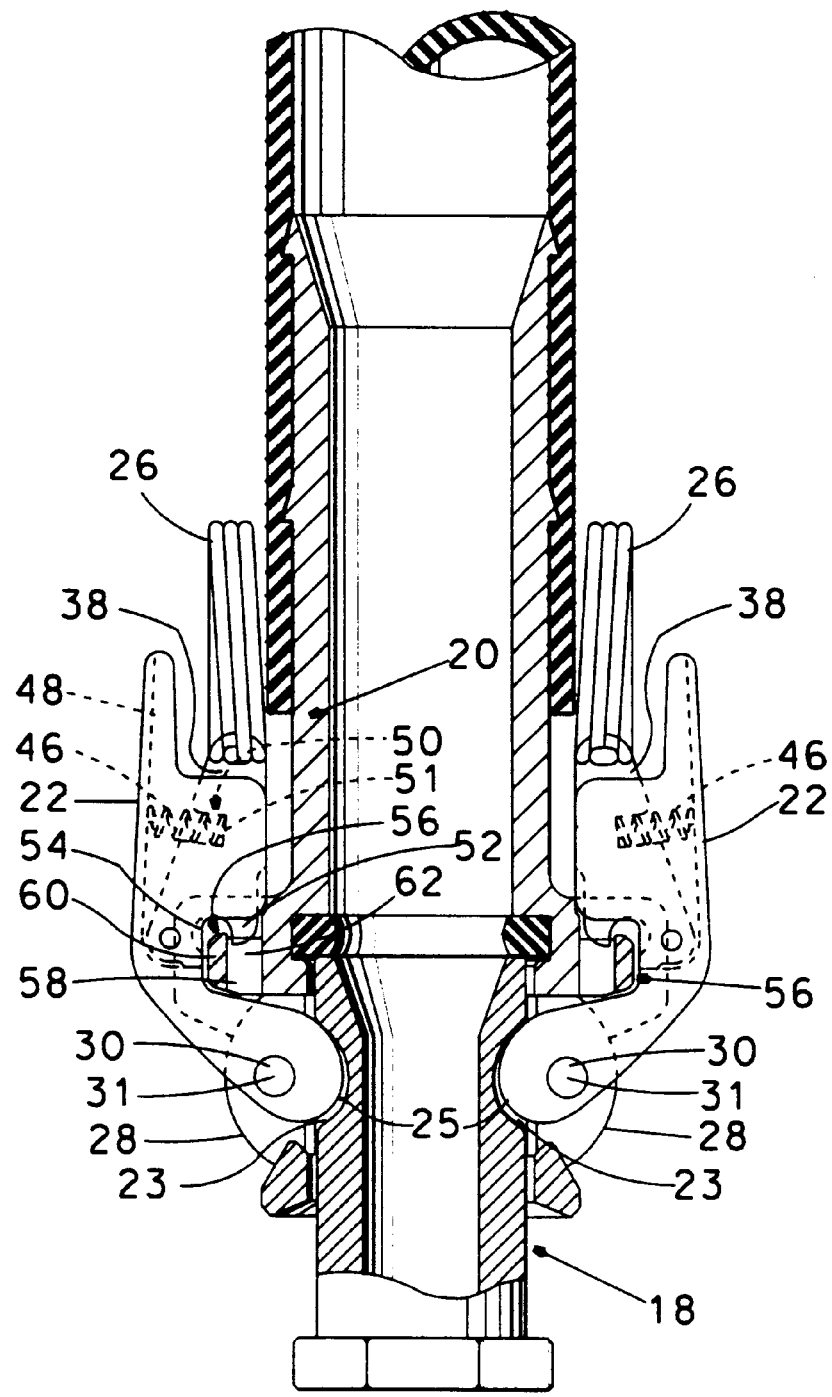
FIG. 3 is a cross-sectional view of the female coupling member of FIG. 2 with the cam arms engaged in a locked position with a male coupling member, the cam arms being secured by the locking mechanism.

As is apparent from FIGS. 2 and 3, the female coupling member 20 includes a pair of oppositely disposed pivotally mounted cam arms 22. The cam arms 22 are used to rotate cam surfaces 25. Cam surfaces 25 are used to engage a peripheral groove 23 located in the male coupling member 18, as indicated in FIG. 3. Examples of male coupling members with such peripheral grooves and female coupling members having cam surfaces mounted on the end portions of cam arms for engaging the peripheral grooves are disclosed in U.S. Pat. Nos. 5,295,717 and 5,435,604, the entire disclosures of which are incorporated herein by reference.

Referring again to FIGS. 2 and 3, each cam arm 22 is pivotally connected to the female coupling member 20. To aid in achieving this connection, a pair of pivot ears extend outwardly from the opposite outer surfaces of the coupling 20. One such pair of pivot ears, 27 and 28 are illustrated in FIG. 2. Pivot ears 27 and 28 are positioned proximal to the outboard end of the coupling 20. Aligned apertures 32 and 34 extend through the pivot ears 27 and 28 respectively along the first pivotal axis 31. A first cam arm aperture 36 extends through the inboard end of the cam arm 22 as best illustrated in FIG. 2. With the cam arm 22 positioned between the pivot ears 27, 28, and the first cam arm aperture 36 aligned with the pivot ear apertures 32, 34, the cam arm 22 is pivotally secured to the coupling 20 by a pin 30. Both cam arms 22 are pivotally mounted in a similar manner.

Figure 5:
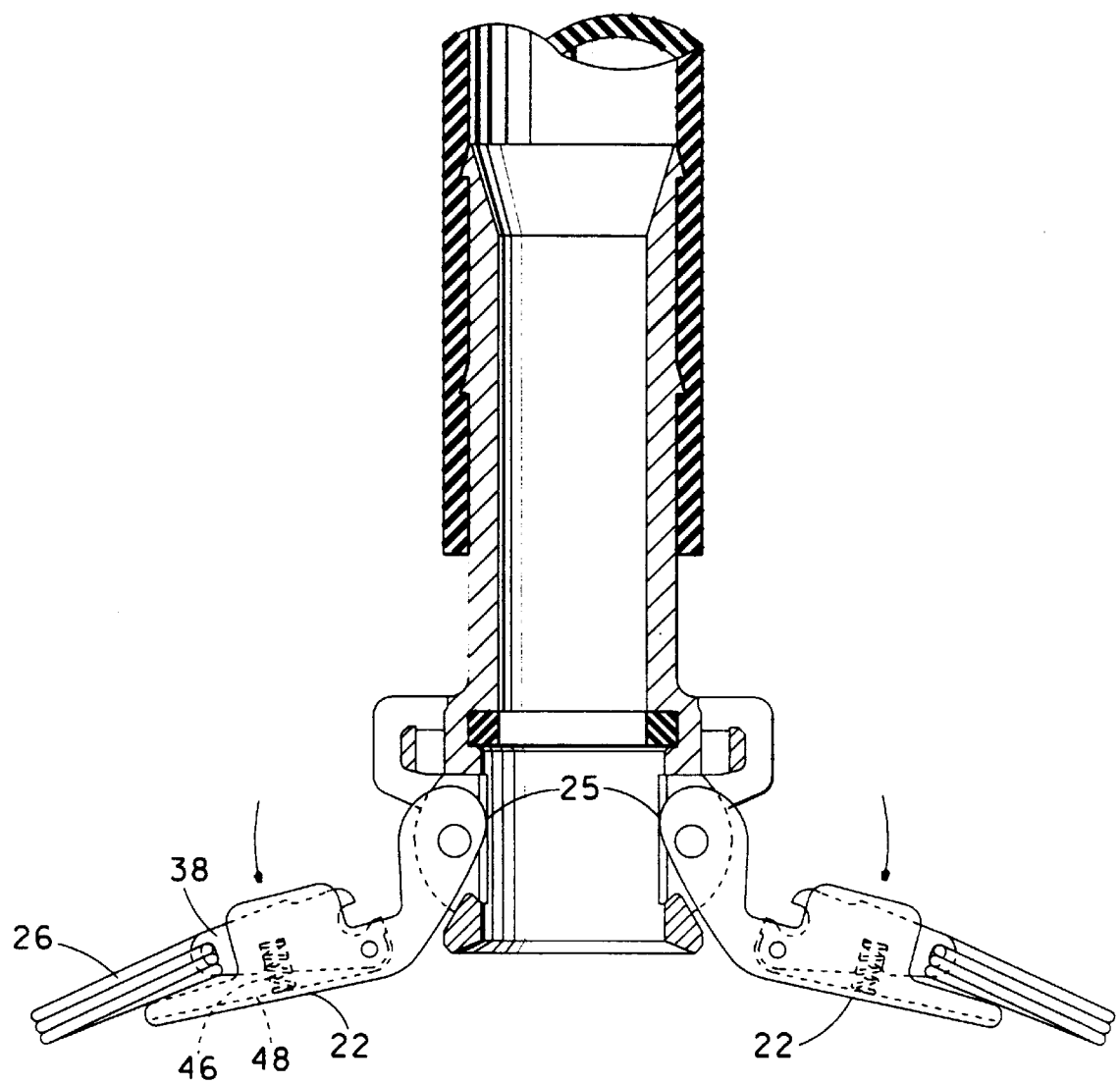
FIG. 5 is a cross-sectional view similar to FIGS. 2 and 3, but showing the cam arms positioned in an unlocked position and the male coupling member disengaged from the female coupling member.

FIG. 3 illustrates each cam arm 22 in a first locked position in which the cam arms are oriented in a generally parallel relationship to the female coupling member 20. As those skilled in the art will readily appreciate, the radial distance between the first pivotal axis 31 of the cam arm 22 and portions of the cam surface 25 vary as a function of the circumferential position of the cam surface 25. More particularly, the cam surface 25 is configured and dimensioned so that, when the cam arm 22 is in the locked position, as depicted in FIG. 3, the cam surface 25 extends into and applies a pressing force against the peripheral retaining groove 23 of the male coupling member 18 when it is positioned within the female coupling member 20. The cam surface 25 also is configured so that when the cam arm 22 is in the radially outwardly extending position, as depicted in FIG. 5, the radial inward extension of cam surface is minimized and the cam surface does not extend into the groove of a male coupling 18 positioned within the coupling member 20. Thus, when both cam arms 22, are in the unlocked position, the male coupling member 18 is freely movable within the female coupling member 20, allowing the male coupling member to be disconnected from the female member, as depicted in FIG. 5.

As noted above, it is important to protect against unintended rotational movement of cam arms 22, because such movement might release the connection between the cam surfaces 25 and the peripheral retainer groove 23, creating the risk that the coupling members will be disconnected while fluid is being transmitted therethrough. Thus, in accordance with the principles of the present invention, each cam arm 22 of the illustrated embodiment is restrained against unintended rotation by a locking member, generally designated by the numeral 38. As illustrated in the preferred embodiment of FIG. 2, locking member 38 is pivotally connected to the cam arm 22 about a second pivotal axis 45 and, thus, is pivotally movable relative to the cam arm. In order to achieve this connection, a locking member aperture 40 extends through the locking member 38 and a second cam arm aperture 42 extends through the middle portion of the cam arm 22. When the locking member aperture 40 is aligned with the second cam arm aperture 42, the locking member 38 is pivotally secured to the cam arm by a pin 44. However, although, the locking member 38 is shown as being pivotally secured by pin 44 in the preferred embodiment of FIG. 2, it is to be understood that the locking member can be pivotally secured in other manners without departing from the scope of the present invention.

To restrain the rotational movement of a cam arm, each locking member 38 is engageable with the female coupling member 20, as illustrated in FIG. 3. The female coupling member 20 can be provided with a pair of locking interface structures 56 to aid in the engagement of the locking members 38. Each locking interface structure 56 can include a base portion 58 and an upper portion 60 which define an opening 62 for receiving a locking interface portion of the locking member 38. The locking interface portion can include a male portion 52 and a recess 54. When a cam arm 22 is in the locked position of FIG. 3, the male portion 52 of the locking member 38 engages the opening 62 of the locking interface structure 56, and the upper portion 60 of the locking interface structure 56 engages the recess 54 of the locking member. When a locking member 38 is engaged with a locking interface structure 56 in such a manner, the cam arm 22 to which the locking member is connected is prevented from inadvertent rotation; the cam arm cannot be rotated unless the male portion 52 is removed from the opening 62 and, thus, the locking member is disengaged from the locking interface structure. However, although the locking members 38 of the preferred embodiment restrains rotation of the cam arms in a particular manner, it is to be understood that the locking members 38 can restrain rotation in other manners without departing from the scope of the invention. For example, the locking members 38 could engage the male coupling member 18 instead of the female coupling member 20.

To maintain each locking member 38 in engagement with its corresponding locking interface structure 56 and, thus, to maintain each of the cam arms 22 in the locked position of FIG. 3, a biasing mechanism, such as spring 46, can be utilized. As illustrated in FIG. 3, spring 46 can be partially disposed within a slot 50 of each locking member 38. The outboard end of each spring 46 is attached to the contact surface 48 of the cam arm 22. The inboard end of each spring 46 is attached to the locking member 38 at the attachment surface 51 located at the bottom of the slot 50. Spring 46 biases the locking member 38 to a predetermined pivotal position with respect to the cam arm 22. Thus, when the cam arms 22 are in the locked position of FIG. 3, the springs 46 maintain the locking members 38 in engagement with the locking interface structures 56. Accordingly, a cam arm 22 cannot be rotated to the unlocked position of FIG. 5 unless the bias of spring 46 is overcome. However, it should be noted that, although the preferred embodiment depicts the biasing mechanism as a spring 46, other mechanisms can be utilized to bias the locking member 38 towards engagement with the locking interface structure 56 such as a resiliently deformable clipping mechanism.

Figure 4:
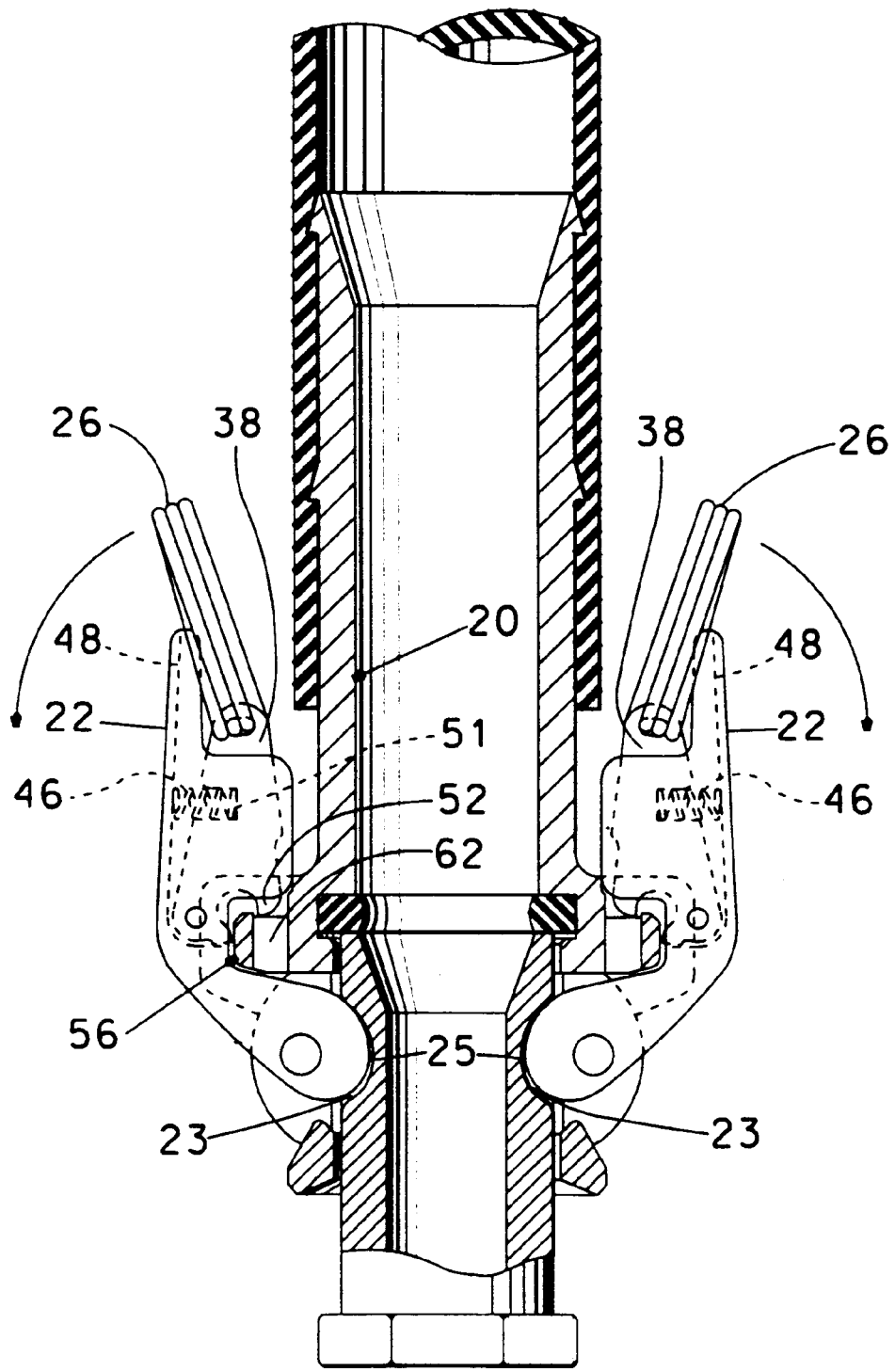
FIG. 4 is cross-sectional view similar to FIG. 3, but showing the locking members disengaged from the locking interface structures by use of spring rings.

To overcome the bias of spring 46 and disengage the locking member 38 from the locking interface structure 56, each locking member 38 can be rotated away from the female coupling member 20 by use of a spring ring 26, as illustrated in FIG. 4. Rotating the locking member 38 in this manner compresses the spring between the locking member and the cam arm 22; more particularly, the spring 46 is compressed between the attachment surface 51 and the contact surface 48. This rotational motion also removes the male portion 52 of the locking member 38 from the opening 62 of the locking interface structure 56. When the male portion 52 is removed from the opening 62, cam arm 22 is free to rotate from the locked position of FIG. 3 to the unlocked position of FIG. 5.

As indicated by comparing FIGS. 4 and 5, the same motion used to disengage the locking member 38 from the locking interface structure 56 can also be used to rotate the cam arm 22 to the unlocked position. Spring rings 26 can be used to implement this continuous motion. As noted above and illustrated in FIG. 4, the user can utilize spring ring 26 to apply a rotational force to the locking member 38 and disengage the locking member 38 from the locking interface structure 56. Once disengagement has been effectuated, the user can continue to utilize the spring ring 26 to rotate the cam arm 22 to the unlocked position of FIG. 5. The cam arm 22 can be rotated by utilizing the force of the locking member 38 as it makes contact with the contact surface 48 and/or by utilizing the force of the spring ring 26 in contact with portions of the cam arm 22. Accordingly, the spring ring 26 can simultaneously act as a release mechanism for disengaging the locking member 38 from the locking interface structure 56 as well as for rotating the cam arm 22 to the unlocked position, all of which can be performed in one continuous motion. As noted above, once the cam arms 22 are in the unlocked position, the cam surfaces 25 are clear of the peripheral groove 23 so that the male coupling member 18 can be removed and disengaged from the female coupling member 20. Although it is preferred that spring ring 26 be utilized to disengage the locking member 38 and rotate the cam arm 22, other means could be employed to perform this function without departing from the scope of the invention. For example, the user could grasp the locking member 38 directly to, in one fluid motion, disengage the member from the locking interface structure 56 and rotate the cam arm 22 to the unlocked position.

In summary, numerous benefits have been described which result from employing the concepts of the present invention. Advantageously, the lock mechanism does not contain internal chambers that are difficult to clean and maintain. Furthermore, one continuous motion can be utilized to disengage the locking member and rotate the cam arm to an unlocked position. In addition, the mechanism will continue to function without the presence of the spring ring.

The embodiment of the invention illustrated in the drawings was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An assembly for selectively interlocking two coupling members, comprising:

a cam arm having first and second ends, the cam arm being adapted to be pivotally connected to a first coupling member, the cam arm having a cam surface at the first end adapted to selectively interface with a second coupling member for securing the second coupling member with respect to the first coupling member when the cam arm is in a locked position, the cam arm being rotatable in a first rotational direction from the locked position to an unlocked position;

a locking member, the locking member being pivotally connected to the cam arm about a pivotal axis, the locking member being pivotally movable relative to the cam arm and being adapted to selectively engage a structure on the first coupling member to prevent rotation of the cam arm relative to the first coupling member when the cam arm is in the locked position, wherein the locking member is rotatable in the first rotational direction to disengage the locking member from the structure, and wherein the locking member includes only one lever arm; and a biasing mechanism extending between the locking member and the cam arm, the biasing mechanism being adapted to bias the locking member to a predetermined pivotal position with respect to the cam arm, wherein the locking member is adapted such that a continuous rotation of the locking member in the first rotational direction i) disengages the locking member from the structure, ii) applies force to a contact surface on the cam arm, and iii) rotates the cam arm toward the unlocked position.

2. The assembly as recited in claim 1 wherein the cam arm extends outwardly from the first coupling member when in the unlocked position, and wherein the cam arm is rotatable in a plane that intersects the first coupling member.

3. The assembly as recited in claim 1 wherein the structure comprises:

a locking interface structure on the first coupling member, the locking member having a locking interface portion adapted to cooperatively interface with the locking interface structure and to selectively engage the locking interface structure to selectively prevent relative rotation between the cam arm and the first coupling member when the cam arm is in a locked position.

4. The assembly as recited in claim 3 wherein the locking interface structure comprises:

a base portion connected to the first coupling member and extending upwardly therefrom; and an upper portion extending at an angle from the base portion.

5. The assembly as recited in claim 4 wherein the locking interface portion includes a recess, the recess being operative for engaging the upper portion of the locking interface structure.

6. The assembly as recited in claim 4 wherein the locking interface structure further comprises:

an opening defined by the base portion and the upper portion.

7. The assembly as recited in claim 6 wherein the locking interface portion includes a male portion, the male portion being operative for engaging the opening in the locking interface structure.

8. The assembly as recited in claim 1 wherein the biasing mechanism comprises a spring disposed between the contract surface of the cam arm and a surface of the locking member.

9. The assembly as recited in claim 1 further comprising:

a release mechanism connected to the locking member, wherein the release mechanism is adapted such that the application of force to the release mechanism is operative to:

(a) compress the biasing mechanism between the cam arm and the locking member;

(b) disengage the locking member from the structure; and (c) rotate the cam arm away from the first coupling member and toward the unlocked position.

10. In combination with a first coupling member, a locking assembly for securing the first coupling member to a second coupling member, comprising:

a cam arm having first and second ends with a cam surface at its first end adapted to secure the first coupling member relative to a second coupling member, the cam arm being pivotally connected to the first coupling member about a pivotal axis, the cam arm being rotatably movable in a first rotational direction about the pivotal axis between a first locked position and second unlocked position;

a locking member pivotally connected to the cam arm, the locking member being pivotally movable relative to the cam arm about a pivotal axis and having a first extending portion, a second extending portion, and a recessed portion disposed between the extending portions, wherein the locking member includes only one lever arm;

a locking interface structure disposed on the first coupling and having an opening, wherein the recessed portion of the locking member is adapted to selectively engage the locking interface structure and the first extending portion is adapted to selectively engage the opening to selectively prevent relative rotation between the cam arm and the first coupling member when the cam arm is in the locked position; and a biasing mechanism adapted to bias the locking member into engagement with the locking interface structure, wherein the locking member is adapted such that a continuous rotation of the locking member about the pivotal axis in the first rotational direction i) compresses the biasing mechanism, ii) disengages the locking interface portion from the locking interface structure, iii) applies an unlocking force to the cam arm, and iv) rotates the cam arm in the first rotational direction and toward the unlocked position.

11. The locking assembly as recited in claim 10 wherein the cam arm is pivotally connected to the first coupling member about a first pivotal axis, and wherein the locking member is pivotally connected to the cam arm about a second pivotal axis that is in spaced parallel relationship to the first pivotal axis.

12. The locking assembly as recited in claim 10 wherein the locking interface structure comprises a base portion and an upper portion connected to the base portion, the base portion and upper portion defining the opening for receiving the first extending portion.

13. The locking assembly as recited in claim 12 wherein the recess of the locking member is adapted for engaging the upper portion of the locking interface structure.

14. The assembly as recited in claim 10 wherein the biasing mechanism is disposed between the cam arm and the locking member, and is adapted such that the unlocking force is provided at least partially by the compression of the biasing mechanism between the cam arm and the locking member upon rotation of the locking member.

15. The assembly as recited in claim 14 further comprising a release mechanism connected to the locking member, wherein the release mechanism is adapted such that the application of force to the release mechanism causes said rotation of the locking member, said compression of the biasing mechanism, said disengagement of the locking interface portion, said application of the unlocking force to the cam arm, and said rotation of the cam arm toward the unlocked position.

16. An assembly for securing a pair of conduits, comprising a first coupling member;

a second coupling member;

a cam arm pivotally connected to the first coupling member and having a cam surface adapted to engage the second coupling member, wherein the cam arm is adapted to be pivoted to disengage the cam surface;

a locking member pivotally connected to the cam arm, wherein the locking member includes only one lever arm;

a locking interface structure connected to a coupling member and extending therefrom, wherein the locking member is adapted to engage the locking interface structure to lock the cam arm in an engaged position; and a biasing mechanism adapted to bias the locking member into engagement with the locking interface structure;

wherein the locking member is adapted to be rotated with a continuous motion in a first rotational direction to: i) disengage the locking member from the locking interface structure, ii) impart pivotal movement of the cam arm in the first rotational direction, and iii) cause disengagement between the cam surface and second coupling member.

17. The assembly of claim 16, wherein the locking member includes a recessed portion, wherein the locking interface structure includes a base portion extending outwardly from the first coupling member and an upper portion connected to the base portion, and wherein the recessed portion is engageable with the upper portion.

18. The assembly of claim 16, wherein, during the rotation of the locking member in the first direction, the locking member contacts the cam arm.

19. An assembly for selectively interlocking two coupling members, comprising:

a cam arm having first and second ends, the cam arm being adapted to be pivotally connected to a first coupling member, the cam arm having a cam surface at the first end adapted to selectively interface with a second coupling member for securing the second coupling member with respect to the first coupling member when the cam arm is in a locked position, the cam arm being rotatable from the locked position to an unlocked position;

a locking member, the locking member being pivotally connected to the cam arm about a pivotal axis, the locking member being pivotally movable relative to the cam arm and being adapted to selectively engage a structure on the first coupling member to prevent rotation of the cam arm relative to the first coupling member when the cam arm is in the locked position, wherein the locking member is rotatable away from the first coupling member to disengage the locking member from the structure, said rotation of the locking member away from the first coupling member being operative to cause the cam arm to rotate toward the unlocked position, wherein the structure comprises:

a locking interface structure on the first coupling member, the locking member having a locking interface portion adapted to cooperatively interface with the locking interface structure and to selectively engage the locking interface structure to selectively prevent relative rotation between the cam arm and the first coupling member when the cam arm is in a locked position, a biasing mechanism disposed between the locking member and the cam arm, the biasing mechanism being operative for biasing the locking member to a predetermined pivotal position with respect to the cam arm, wherein the rotation of the locking member away from the first coupling member causes the biasing mechanism to apply force to a contact surface on the cam arm and to rotate the cam arm toward the unlocked position.

20. The assembly as recited in claim 19 wherein the biasing mechanism comprises a spring disposed between the contact surface of the cam arm and a surface of the locking member.

21. The assembly as recited in claim 19 further comprising:

a release mechanism connected to the locking member, whereby the application of force to the release mechanism is operative to (a) compress the biasing mechanism between the cam arm and the locking member;

(b) disengage the locking member from the locking interface structure; and (c) rotate the cam arm away from the first coupling member and toward the unlocked position.

22. In combination with a first coupling member, a locking assembly for securing the first coupling member to a second coupling member, comprising:

a cam arm having first and second ends with a cam surface at its first end adapted to secure the first coupling member relative to a second coupling member, the cam arm being pivotally connected to the first coupling member about a pivotal axis, the cam arm being rotatably movable relative to the first coupling member about the pivotal axis between a first locked position and second unlocked position a locking member pivotally connected to the cam arm, the locking member being pivotally movable relative to the cam arm about a pivotal axis and having a first extending portion, a second extending portion, and a recessed portion disposed between the extending portions;

a locking interface structure disposed on the first coupling member and having an opening, wherein the recessed portion of the locking member is adapted to selectively engage the locking interface structure and the first extending portion is adapted to selectively engage the opening to selectively prevent relative rotation between the cam arm and the first coupling member when the cam arm is in the locked position, and wherein the locking member is pivotally movable about a pivotal axis to disengage the locking interface portion from the locking interface structure to permit rotation of the cam arm relative to the first coupling member; and a biasing mechanism in contact with the locking member, the biasing mechanism being adapted to bias the locking member toward a predetermined rotational position with respect to the cam arm, wherein the cam arm includes a contact surface, the contact surface being operative, upon the application of force thereto, to rotate the cam arm toward the unlocked position, wherein the biasing mechanism is disposed between the contact surface of the cam arm and a surface of the locking member, and wherein rotation of the locking member away from the first coupling member disengages the locking member from the locking interface structure and causes the biasing mechanism to apply force to the contact surface of the cam arm and to rotate the cam arm toward the unlocked position.

23. The assembly as recited in claim 22 further comprising a release mechanism connected to the locking member, whereby the application of force to the release mechanism is operative to (a) compress the biasing mechanism between the contact surface and the locking member;

(b) disengage the locking member from the locking interface structure; and (c) rotate the cam arm toward the unlocked position.

24. A method for unlocking a first coupling member from a second coupling member with a continuous motion, the first coupling member being provided with a cam arm, the cam arm being provided with a locking member, the method comprising:

grasping the locking member, wherein the locking member includes only one lever arm;

rotating the locking member in a first rotational direction;

by said rotation of the locking member, disengaging the locking member from a locking interface structure provided on one of said first and second coupling members;

by said rotation of the locking member, imparting pivotal movement of the cam arm in the first rotational direction; and by said rotation of the locking member, disengaging the cam arm from a cam surface.

25. The method as recited in claim 24, further comprising:

by said rotation of the locking member, compressing a biasing member provided between the locking member and the cam arm.

26. An assembly for selectively interlocking two coupling members, comprising:

a cam arm having first and second ends, the cam arm being adapted to be pivotally connected to a first coupling member, the cam arm having a cam surface at the first end adapted to selectively interface with a second coupling member for securing the second coupling member with respect to the first coupling member when the cam arm is in a locked position, the cam arm being rotatable from the locked position to an unlocked position;

a locking member, the locking member being pivotally connected to the cam arm about a pivotal axis, the locking member being pivotally movable relative to the cam arm and being adapted to selectively engage a structure on the first coupling member to prevent rotation of the cam arm relative to the first coupling member when the cam arm is in the locked position, wherein the locking member is rotatable away from the first coupling member to disengage the locking member from the structure; and a biasing mechanism extending between the locking member and the cam arm, the biasing mechanism being adapted to bias the locking member to a predetermined pivotal position with respect to the cam arm, wherein the locking member is adapted such that the rotation of the locking member away from the first coupling member disengages the locking member from the structure, applies force to a contact surface on the cam arm, and rotates the cam arm toward the unlocked position, wherein the biasing mechanism comprises a spring disposed between the contact surface of the cam arm and a surface of the locking member.

27. An assembly for selectively interlocking two coupling members, comprising:

a cam arm having first and second ends, the cam arm being adapted to be pivotally connected to a first coupling member, the cam arm having a cam surface at the first end adapted to selectively interface with a second coupling member for securing the second coupling member with respect to the first coupling member when the cam arm is in a locked position, the cam arm being rotatable from the locked position to an unlocked position;

a locking member, the locking member being pivotally connected to the cam arm about a pivotal axis, the locking member being pivotally movable relative to the cam arm and being adapted to selectively engage a structure on the first coupling member to prevent rotation of the cam arm relative to the first coupling member when the cam arm is in the locked position, wherein the locking member is rotatable away from the first coupling member to disengage the locking member from the structure;

a biasing mechanism extending between the locking member and the cam arm, the biasing mechanism being adapted to bias the locking member to a predetermined pivotal position with respect to the cam arm, wherein the locking member is adapted such that the rotation of the locking member away from the first coupling member disengages the locking member from the structure, applies force to a contact surface on the cam arm, and rotates the cam arm toward the unlocked position; and a release mechanism connected to the locking member, wherein the release mechanism is adapted such that the application of force to the release mechanism is operative to:

(a) compress the biasing mechanism between the cam arm and the locking member;

(b) disengage the locking member from the structure; and (c) rotate the cam arm away from the first coupling member and toward the unlocked position.

28. In combination with a first coupling member, a locking assembly for securing the first coupling member to a second coupling member, comprising:

a cam arm having first and second ends with a cam surface at its first end adapted to secure the first coupling member relative to a second coupling member, the cam arm being pivotally connected to the first coupling member about a pivotal axis, the cam arm being rotatably movable relative to the first coupling member about the pivotal axis between a first locked position and second unlocked position;

a locking member pivotally connected to the cam arm, the locking member being pivotally movable relative to the cam arm about a pivotal axis and having a first extending portion, a second extending portion, and a recessed portion disposed between the extending portions;

a locking interface structure disposed on the first coupling and having an opening, wherein the recessed portion of the locking member is adapted to selectively engage the locking interface structure and the first extending portion is adapted to selectively engage the opening to selectively prevent relative rotation between the cam arm and the first coupling member when the cam arm is in the locked position, and wherein the locking member is rotatable about a pivotal axis; and a biasing mechanism adapted to bias the locking member into engagement with the locking interface structure, wherein the locking member is adapted such that rotation of the locking member about the pivotal axis compresses the biasing mechanism, disengages the locking interface portion from the locking interface structure, applies an unlocking force to the cam arm, and rotates the cam arm toward the unlocked position, wherein the biasing mechanism is disposed between the cam arm and the locking member, and is adapted such that the unlocking force is provided at least partially by the compression of the biasing mechanism between the cam arm and the locking member upon rotation of the locking member.

29. The assembly as recited in claim 28 further comprising a release mechanism connected to the locking member, wherein the release mechanism is adapted such that the application of force to the release mechanism causes said rotation of the locking member, said compression of the biasing mechanism, said disengagement of the locking interface portion, said application of the unlocking force to the cam arm, and said rotation of the cam arm toward the unlocked position.

* * * * *